(12) United States Patent
Mandal et al.

(10) Patent No.: US 7,660,195 B2
(45) Date of Patent: Feb. 9, 2010

(54) ATTENUATION MAPPING APPARATUS, SYSTEMS, AND METHODS

(75) Inventors: Batakrishna Mandal, Missouri City, TX (US); Clovis Bonavides, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/923,429

(22) Filed: Aug. 20, 2004

(65) Prior Publication Data
US 2006/0039238 A1  Feb. 23, 2006

(51) Int. Cl.
*G01V 1/40* (2006.01)
(52) U.S. Cl. .............................. 367/29; 367/28; 367/32; 181/102
(58) Field of Classification Search .................. 367/25, 367/27–32, 35, 69–70; 702/6; 181/102
See application file for complete search history.

(56) References Cited

U.S. PATENT DOCUMENTS

| | | | | |
|---|---|---|---|---|
| 4,562,557 A | * | 12/1985 | Parks et al. | 367/27 |
| 4,594,691 A | * | 6/1986 | Kimball et al. | 367/32 |
| 4,672,588 A | * | 6/1987 | Willen | 367/28 |
| 4,698,793 A | * | 10/1987 | Wu | 367/32 |
| 4,703,460 A | * | 10/1987 | Kurkjian et al. | 367/31 |
| 4,791,619 A | * | 12/1988 | Liu | 367/35 |
| 4,809,236 A | * | 2/1989 | Hsu et al. | 367/28 |
| 5,077,697 A | * | 12/1991 | Chang | 367/31 |
| 5,278,805 A | * | 1/1994 | Kimball | 367/32 |
| 5,594,706 A | * | 1/1997 | Shenoy et al. | 367/76 |
| 5,999,484 A | * | 12/1999 | Kimball et al. | 367/31 |
| 6,404,432 B1 | * | 6/2002 | Simpson | 345/440 |
| 6,581,010 B2 | * | 6/2003 | Dubinsky et al. | 702/9 |
| 6,868,341 B2 | * | 3/2005 | Valero | 702/11 |
| 2003/0185100 A1 | * | 10/2003 | D'Angelo et al. | 367/82 |
| 2003/0206487 A1 | * | 11/2003 | Blanch et al. | 367/38 |
| 2004/0145503 A1 | * | 7/2004 | Blanch et al. | 341/76 |

OTHER PUBLICATIONS

Market, et al. "New processing techniques to meet challenges of LWD acoustic logging." Society of Petroleum Engineers, 2001.*
Winkler, et al. "Acoustic velocity and attenuation in porous rocks." American Geophysical Union, 1995.*
Quan, et al. "Seismic attenuation tomography using the frequnecy shift method." Geophysics, May-Jun. 1997.*
Dietrich, et al. Measurements of attenuation from vertical seismci profiles by iterative modeling. Geophysics, Jun. 1985.*
Harrison, A R., et al., "Acquisition and analysis of sonic waveforms from a borehole monopole", *Proceedings of the 1990 SPE annual technical conference and exhibition*, (1990),267-282.

(Continued)

*Primary Examiner*—Scott A Hughes
(74) *Attorney, Agent, or Firm*—Schwegman, Lundberg & Woessner, P.A.

(57) ABSTRACT

In some embodiments, an apparatus and a system, as well as a method and an article, may include generating attenuation values associated with a set of multiple signals received by multiple receivers from a transmitted signal as a function of reception time and material velocity. The attenuation values may be stored in a memory and/or displayed on a display, perhaps in conjunction with a semblance map.

23 Claims, 8 Drawing Sheets

OTHER PUBLICATIONS

Kimball, C V., et al., "Semblance processing of borehole acoustic array data", *Geophysics*, 49(3), (Mar. 1984), 274-81.

Kurkjian, A , "Slowness estimation from sonic logging waveforms", *Geoexploration*, 27(3-4), (1991), 215-256.

Morris, C F., et al., "A New Sonic Array Tool for Full Waveform Logging", *59th Annual Technical Conference and Exhibition (Society of Petroleum Engineers of AIME)*, (1984), 381-387.

* cited by examiner

ATTENUATION MAPPING APPARATUS, SYSTEMS, AND METHODS

TECHNICAL FIELD

Various embodiments described herein relate to information processing generally, including apparatus, systems, and methods for processing signal information obtained by a borehole tool.

BACKGROUND INFORMATION

Acoustic well logging is a well developed art, and details of acoustic logging tools and techniques are set forth in A. Kurkjian, et al., "Slowness Estimation from Sonic Logging Waveforms", Geoexploration, Vol. 277, pp. 215-256 (1991); C. F. Morris et al., "A New Sonic Array Tool for Full Waveform Logging," SPE-13285, Society of Petroleum Engineers (1984); A. R. Harrison et al., "Acquisition and Analysis of Sonic Waveforms From a Borehole Monopole and Dipole Source . . . " SPE 20557, pp. 267-282 (September 1990); and C. V. Kimball et al., "Semblance Processing of Borehole Acoustic Array Data", Geophysics, Vol. 49, pp. 274-281 (March 1984), all of which are hereby incorporated by reference herein.

An acoustic logging tool may include an acoustic source (transmitter), and a set of receivers that are spaced apart from each other. An acoustic signal may be transmitted by the acoustic source and received at the receivers. Measurements can be repeated periodically as the tool is drawn up (or down) the borehole. The acoustic signal from source may travel through the formation adjacent the borehole to the receiver array, and the arrival times and perhaps other characteristics of the receiver responses are recorded. Received signals may include compressional wave (P-wave), shear wave (S-wave), and Stoneley waves. Received data may be processed to find formation characteristics, including slowness (the inverse of acoustic speed), from which pore pressure, porosity, and other formation property determinations can be made.

Typically, the processing involves digitizing the received signal at a desired sampling rate and then processing the digitized samples according to desired techniques. Examples may be found in the references cited above, as well as in articles such as A. R. Harrison et al., "Acquisition and Analysis of Sonic Waveforms From a Borehole Monopole and Dipole Source . . . " SPE 20557, pp. 267-282 (September 1990). In some tools, the acoustic signals may even be used to image the formation.

Traditional compensated bonding analysis may identify casing arrivals using the signals from two transmitters and two receivers, depending on the peak amplitude of first arrival signals. However, sensitivity to signal amplitudes may induce failure when the signals are weak. Detection of casing arrival signals may also require additional input from an operator, including gating setup and gain adjustments.

DETAILED DESCRIPTION

Compressional slowness has been computed using Slowness-Time Coherence (STC) processing. In STC processing, the measured signal may be time window "filtered" and stacked, and a semblance function computed to relate the presence or absence of an arrival signal with a particular assumed slowness and arrival time. If the assumed slowness and arrival time do not coincide with that of the measured arrival, the semblance may take on a smaller value. Consequently, received waveform arrivals may manifest themselves as local peaks in a plot of semblance versus slowness and arrival time. These peaks are may be found using a peak-finding routine, as discussed in C. V. Kimball et al., "Semblance Processing of Borehole Acoustic Array Data", Geophysics, Vol. 49, pp. 274-281 (March 1984), incorporated herein by reference.

Acoustic logging while drilling (LWD) has many potential applications in oil field services including seismic correlation while drilling, pore pressure/porosity determination, and mechanical property determination. Because telemetry cables may not be available, data may be transferred via pulses in the flow of the drilling mud (i.e., mud pulse telemetry). While the drilling penetration rate may be relatively slow relative with respect to logging rates, data acquisition rates can easily exceed available transmission rates in the mud. Thus, in the acoustic LWD art, processing data downhole (including semblance processing) may be highly desirable, even when downhole computing power is limited. In some embodiments, data may be stored in the memory of the downhole tool, but this can require frequent "tripping" of the drill string.

One technique that can be used to process downhole data with limited computing power involves time windowing and stacking of the measured acoustic signal (e.g., to calculate a semblance function). However, windowing the signal may result in inaccuracies and nonlinearities based on the window width for the resulting semblance. Extrapolating from the windowed semblance may provide additional error sources.

A non-windowed technique may also be used to calculate semblance functions and determine acoustic speed, including the formation velocity. These parameters may be calculated using each data point collected, such that in some embodiments, less processing is needed. The number of errors that occur using windowed calculations of formation velocity and semblance may also be reduced.

Figure 1A:
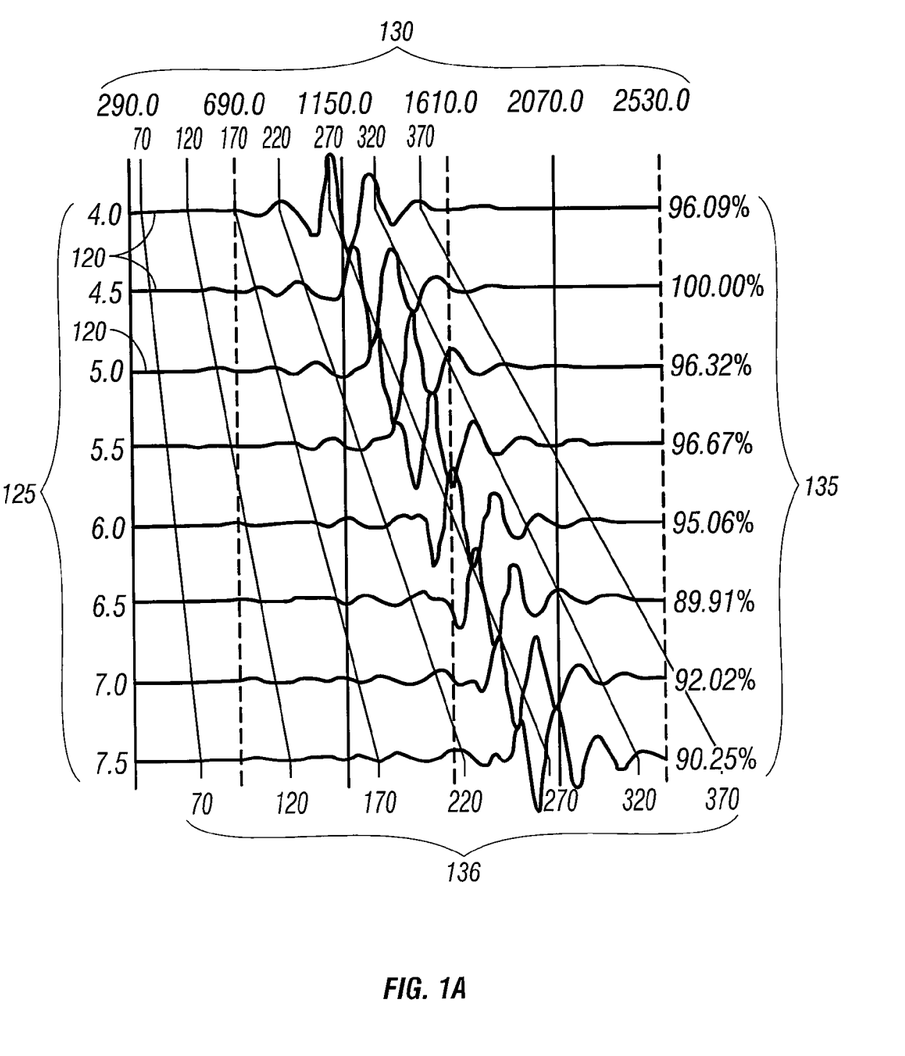
FIG. 1A shows acoustic wave signals categorized by the distance of the receiver from the transmitter and the time at which the signals are received according to various embodiments of the invention.

For example, an acoustic logging tool may include several receivers axially spaced along the logging tool. An acoustic transmitter may generate an acoustic wave that propagates along the well bore to be detected by the receivers. FIG. 1A shows an example of the data collected by an acoustic logging tool from in response to a wave generated by the transmitter. Each of the waveforms 120 may be recorded by a corresponding receiver as a function of time 130 after the transmitter is fired; each receiver may be associated with a distance 125 from the transmitter. After recording the waveforms, the logging tool may operate to normalize the waveform so that each acquired waveform has substantially the same signal energy.

FIG. 1A expresses the normalization factor as a percentage of transmitted signal energy 135. FIG. 1A also shows a graduated series of sloping lines to indicate the relative waveform delays to be expected for given slowness values 136. Slower waves (those having larger slowness values) take longer to reach the more distant receivers; their effect on the recorded waveforms may be increasingly delayed for larger distances.

To identify waves and their slowness values, the acoustic logging tool may calculate the time semblance E(t,s) as a function of slowness and time for the data. This information, in turn, may be used to determine various formation properties, including formation velocity and dispersion. The equation for the time semblance E(t,s) may be calculated as:

$$E(t, s) = \frac{\left[\sum_{i=1}^{N} x_i(t - sd_i)\right]^2}{N \sum_{i=1}^{N} x_i^2(t - sd_i)} \quad (1)$$

In Equation (1), N may be set to the number of receivers, and hence the number of recorded waveforms. Thus, $x_i(t)$ is the waveform recorded by the ith receiver, $d_i$ is the distance of the ith receiver from the transmitter, and s is the slowness. The quantity (t−s $d_i$) is the relative time at the ith receiver for a given slowness s.

The recorded waveforms $x_i(t)$ may be sampled digitally. Sample interpolation may be performed to account for slowness shift of the relative time. The acoustic logging tool may operate to resample the waveforms for each slowness value s at which the semblance is calculated.

Semblance values E(t,s) may range between zero and one. Values near one can be used to indicate a high correlation between the various recorded waveforms at the given time and slowness, as well as the presence of a propagating wave having that slowness value. Values near zero may be used to indicate low correlation between the various waveforms at the given time and slowness value, making the presence of propagating waves having that same slowness value unlikely.

Figure 1B:
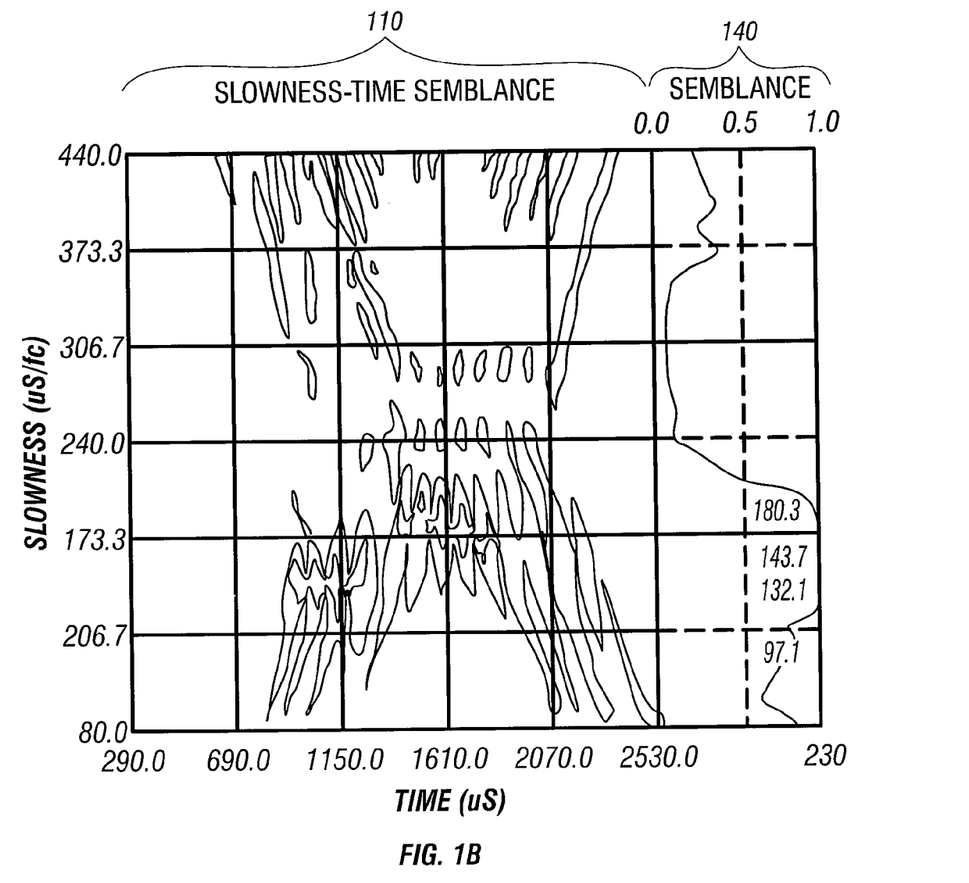
FIG. 1B shows a time semblance mapping as a function of slowness and time for the signals in FIG. 1A according to various embodiments of the invention.

FIG. 1B shows the time semblance E(t,s) plot 110 for the data in FIG. 1A, with the semblance axis being perpendicular to (e.g., coming out of) the page. Also shown on the right is a maximum semblance vs. slowness plot 140 to aid in interpretation of the E(t,s) plot 110, which shows the effect of constructive and destructive interference caused by the oscillatory waveforms 120. This effect is undesirable, making identification of formation velocity properties difficult.

Figure 2:
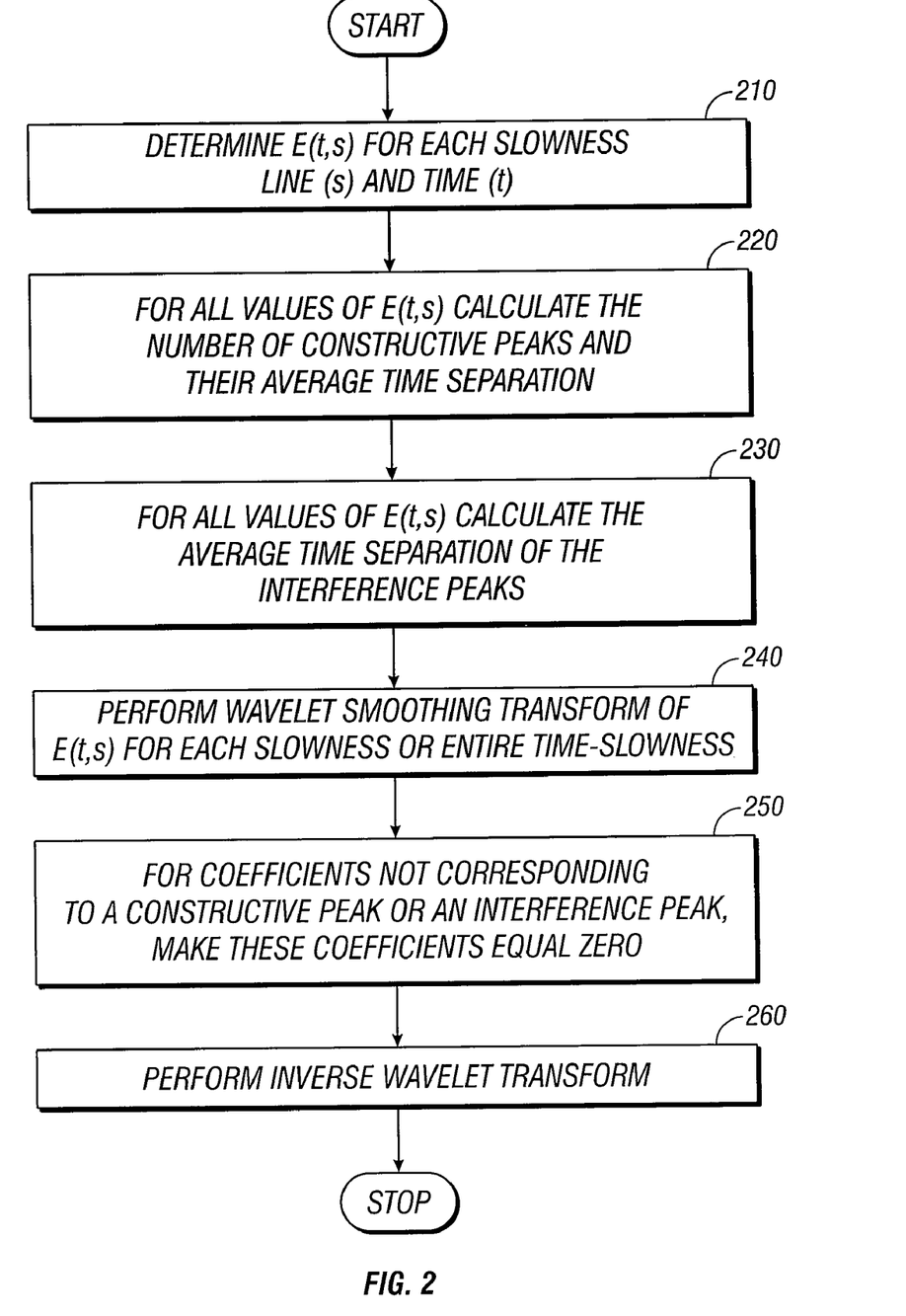
FIG. 2 is a flow diagram illustrating a method to determine time semblance for each slowness line s and time t using adaptive smoothing/wavelet denoising according to various embodiments of the invention.

Turning now to FIG. 2, a method is shown for calculating the time semblance E(t,s) using a coherence method of acoustic wave data analysis. In block 210, Equation (1) may be used to determine the semblance E(t,s) for each slowness line s at each time t. In block 220, the number and average time separation of semblance peaks may determined for each slowness line s.

In block 230, the average time separation of semblance peaks may be determined for the entire plot. This can be accomplished, for example, by using a weighted average to give each average time separation for a given slowness value s a weight of one less than the number of peaks found for that value of s.

In block 240, a wavelet transform may be performed, perhaps by integrating along the time axis for each slowness value s. This can provide a set of wavelet transform coefficients that are functions of delay, frequency, and slowness.

In block 250, some of the wavelet transform coefficients may be set to zero. The average peak separation for each slowness value s can be used to set a cutoff point for that value of s, perhaps corresponding to a time value equal to or greater than about 1.5 times the time separation of interference peaks. In some embodiments, a cutoff point may be set for the entire domain using the plot-average time separation of peaks. Wavelet transform coefficients above the cutoff point may then be set to zero.

In block 260, an inverse wavelet transform may be performed. Together, blocks 220-260 may constitute a wavelet smoothing, or "denoise" operation that removes high-frequency effects (such as the constructive and destructive interference) from the semblance plot. As an alternative, or in addition to wavelet smoothing, an adaptive moving average, known to those of skill in the art, may be used to remove high frequency effects.

Figure 3:
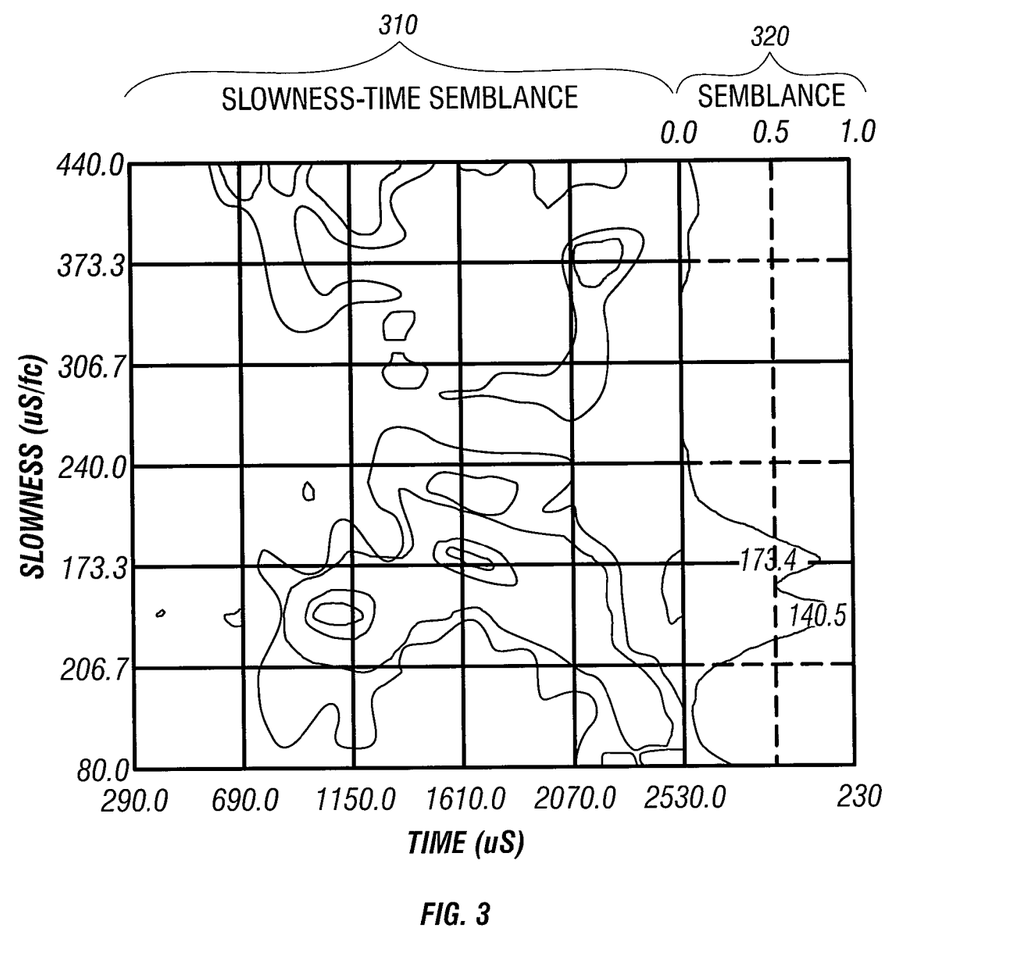
FIG. 3 shows a time semblance mapping as a function of slowness and time indicating a fast wave and slow wave after adaptive smoothing/wavelet denoising according to various embodiments of the invention.

FIG. 3 shows the time semblance plot 310 after the above-described adaptive smoothing/wavelet denoising operations have been effected. A separate graph of maximum semblance 320 as a function of slowness is shown to aid in interpretation. Note that two formation velocities are clearly present in this plot 310, as compared to the plot of FIG. 1B.

In order to address some of the challenges described above with respect to bonding analysis, some embodiments include an array of receivers (e.g., two or more) to may operate to perform beam forming guided compensated attenuation measurements. Slowness vs. attenuation characteristics may be determined, and acoustic wave attenuation may be measured, such that cement bonding analysis may be conducted without time gating. An image of attenuation properties behind the casing and formation may be produced. In some embodiments, a radial image (e.g., radial distance vs. attenuation at depth) can be used to map the formation and cement boundaries. Various methods may be realized as part of the embodiments disclosed herein.

For example, consider the compensated attenuation measurement for multiple transmitters separated by a receiver array. Let $R_{lm}$ be the observed response of the mth receiver receiving a signal from the lth transmitter (e.g., if there are two transmitters and five receivers, l will vary as an integer between 1 and 2, and m will vary as an integer between 1 and 5). Then $R_{lm} = T_l \cdot G_{lm} \cdot R_m$, where $T_l$ represents the transmitter properties of transmitter l, $R_m$ represents the receiver properties of receiver m, and $G_{lm}$ represents the propagation properties from the transmitter l to the receiver m, including any media between them (e.g., Green's function, known to those of skill in the art), such that $G_{lm} = A_0 e^{-\alpha z} e^{i(\omega t - kz)}$, where $A_0$ is a constant, $e^{-\alpha z}$ accounts for attenuation, and $e^{i(\omega t - kz)}$ accounts for propagation.

A composite measurement may then be characterized by the equation:

$$\frac{R_{1i}R_{2j}}{R_{1j}R_{2i}} = \frac{T_1 \cdot G_{1i} \cdot R_i \cdot T_2 \cdot G_{2j} \cdot R_j}{T_1 \cdot G_{1j} \cdot R_j \cdot T_2 \cdot G_{2i} \cdot R_i} = \frac{G_{1i}G_{2j}}{G_{1j}G_{2i}} = 2^{\alpha dz},$$

where $G_{1j} = G_{1i} e^{-\alpha dz}$, $G_{2i} = G_{2j} e^{-\alpha dz}$, and $\alpha$ is the attenuation between receivers $R_i$ and $R_j$.

This relationship permits establishing a relationship between the attenuation property and the signals from, for example, two transmitters and a receiver array, as follows:

$$\frac{1}{2}\ln\left(\frac{R_{1i}R_{2j}}{R_{1j}R_{2i}}\right) = \alpha z + c. \quad (1)$$

Using two transmitters, various combinations of receiver responses can be characterized by the relationship of Equation (1). For example, for five receivers in a linear array, as used in some downhole tools, ten measurements of the form $$C_{ij} \rightarrow \frac{R_{1i}R_{2j}}{R_{1j}R_{2i}}$$

may be derived. Thus, if i, j represent receiver suffixes, then over an distance interval dz (the closest distance between two receivers, assuming approximately equal spacing between all of the receivers arranged in linear fashion), measurements $C_{12}, C_{23}, C_{34}, C_{45}$ may be available. Over a distance of 2*dz, measurements $C_{13}, C_{24}, C_{35}$ may be available. Over a distance 3*dz, measurements $C_{14}, C_{25}$ may be available. And finally, over a distance (n−1)*dz (the distance between the receivers at each end of the linear array—in this case, 4*dz, where n is the number of receivers), measurement $C_{15}$ may be available. After the measurements are made, they can be plotted as a graph in two dimensions, with an vertical axis of $$\frac{1}{2}\ln\left(\frac{R_{1i}R_{2j}}{R_{1j}R_{2i}}\right), \text{ or } \frac{1}{2}\ln C_{ij},$$

and a horizontal axis of dz, 2dz, 3dz, . . . , (n−1)dz.

From these measurements, a stable attenuation measurement may be established by least squares fitting using a straight line to all the different measurements that have been graphed. The slope α represents the average attenuation of the signals propagating in the interval dz. Of course, as is known to those of skill in the art, the radius/depth of investigation depends on the aperture of the linear array. The quality of the straight line fit may indicate the homogeneity of the material behind the casing. For example, if the fit is very good, then the material behind the casing is likely homogenous. The y-intercept constant (e.g., the intersection point of the vertical axis) can be interpreted as the propagation mismatch between the two transmitters.

Different receiver interval responses produce different information at different radii of investigation. Independent attenuation measurements from different receiver separations can be interpreted as the contribution to attenuation at different regions behind the casing. This can be useful information with respect to bond analysis, because the calculated attenuations at different combinations may represent the bonding quality near the casing. These information may be used to interpret the micro-annulus activity around the casing, thus, it is a measure of the quality of bonding.

To calculate $C_{ij}$, it is useful to identify the wave propagating along the receiver array. In general, a time window may be used for this purpose, perhaps chosen to enclose the first arrival cycle of the transmitter signals at each receiver. However, errors may accrue when the signal quality is poor (e.g., cycle skipping may occur, as well as errors in identifying first arrivals).

A more robust method may include the following activities:
Filter the arriving signals within a frequency band of interest (e.g., about 5 kHz to about 25 kHz)
Select a sliding time window for the appropriate frequency band
Enter a slowness calculation loop (to determine propagation velocity) for the sliding time window
Slowness Loop Calculation Beginning
Sliding time window loop beginning
Compute the energy/amplitude values of signals within the time window for each receiver along a selected slowness line
Compute $C_{ij}$ and ½ ln($C_{ij}$) for all receiver combinations for each time window
Compute the average for receiver pairs that have the same separation distance (e.g., all receiver pairs separated by dz, all receiver pairs separated by 2dz, etc.), where each separation is related to a different radius of investigation along the array
Using a least squares fit, calculate the slope and quality of fit, noting that α, which is also the slope, represents the average attenuation along the array
Sliding time window loop end
Form a two-dimensional matrix of the reciprocal of all attenuation values, such that each matrix entry corresponds with a slowness matrix entry:

η(time,slowness)=1/α(time,slowness)

Slowness Loop Calculation End
Detect the peaks in the reciprocal of η (time,slowness) matrix as a function of attenuation α
Identify different arrivals from the peaks of the dominant wave propagating along the attenuation matrix
Mark the attenuation threshold for free and bonded pipe, if desired, as well as the casing arrivals (e.g., perhaps arriving at about 57 μsec/foot, due to the properties of steel, as is known to those of skill in the art). It should be noted that the term "attenuation" as used in this document, may refer to the term α, or its inverse 1/α. Such activities, including the calculation and presentation of a semblance map and/or array, and an attenuation map, and/or array, may be expressed in many different ways.

Figure 4:
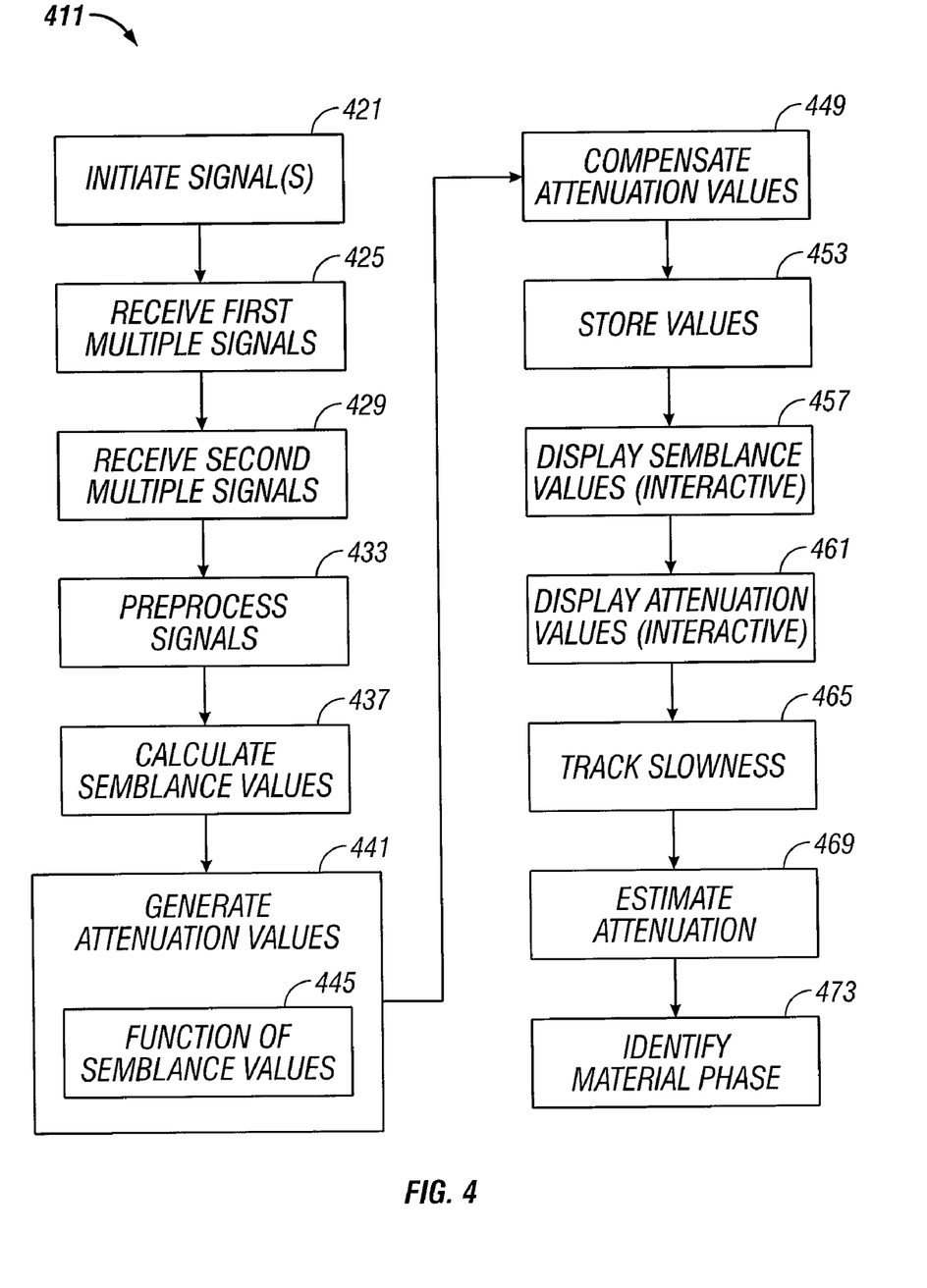
FIG. 4 is a flow chart illustrating several methods according to various embodiments.

For example, FIG. 4 is a flow chart illustrating several methods according to various embodiments. In some embodiments of the invention, a method 411 may (optionally) begin at block 421 with initiating one or more transmitted signals, and receiving one or more corresponding sets of multiple signals with multiple receivers, perhaps organized as a linear array. For example, at block 421, a first transmitter may transmit a first signal, which is then received as a first set of five separate signals by five separate receivers spaced approximately equidistant from each other in a linear array (see FIG. 7 below) at block 425. A second transmitter, perhaps located on the other end of the array from the first transmitter, may likewise transmit a second signal at block 421 (e.g., at a different time then the first signal is transmitted), which may in turn be received as a second set of five separate signals by the five separate receivers at block 429.

The method 411 may include pre-processing the received signals at block 433, perhaps by filtering the signals using a bandpass filter selected according to the frequencies of the transmitted signals, as well as the removal of any unwanted trends in the signals, such as those caused by direct current (DC) offset, etc. The method may include calculating a semblance mapping as a function of the reception time and the material velocity at block 437, perhaps as discussed previously. As noted above, various smoothing methods, including wavelet smoothing, may be used to achieve a more easily interpreted result.

In some embodiments, the method 411 may include generating attenuation values (e.g., $\alpha$, or its inverse $1/\alpha$) associated with the first set of multiple signals received by multiple receivers from the first transmitted signal as a function of reception time and material velocity at block 441. The material velocity may comprises slowness, and the attenuation values may vary as a function of any one or more of the borehole casing attenuation, the attenuation of an adhesive bonded to a borehole casing, and the an attenuation of the associated geological formation behind the adhesive and/or casing. The method 411 may continue with determining the attenuation values as a function of corresponding semblance map values at block 445, such as, for example, determining attenuation values using a one-to-one correspondence with a selected group of semblance values. The method 411 at block 441 may also include calculating the attenuation values as a function of a linear fit to a logarithmic ratio, as described above. The units of the attenuation values may be selected from an inverse length and/or an inverse time.

In some embodiments, the method 411 may include compensating the attenuation values using a second set of multiple signals received by multiple receivers, as received from a second transmitted signal at block 449. For example, this may be accomplished by determining a compensated response value as a function of a response between two of the receivers selected from the multiple receivers (or a ratio of responses associated with multiple receivers), as described previously. The method 411 may include storing the semblance and/or attenuation values in a memory at block 453. This may include, for example, storing attenuation values associated with multiple signals received by multiple receivers from at least one transmitted signal in a memory as a function of reception time and material velocity.

In some embodiments, the method 411 may include displaying the semblance values at block 457, perhaps in the form of a semblance map (see FIG. 5, below). This activity may occur in an interactive fashion, perhaps between a computer user observing the display and a workstation used to generate the display. The method 411 may also include displaying the attenuation values as an attenuation value map at block 461, perhaps by displaying the attenuation values associated with multiple signals received by multiple receivers from one or more transmitted signals as a function of reception time and material velocity on a display (or via hardcopy printout, or projection). To make interpretation easier, the method 411 may include assigning a plurality of colors to selected groups of the attenuation values at block 461. These activities may also occur interactively.

In some embodiments, the method 411 may include tracking slowness values (e.g., across a semblance map) at block 465, and/or estimating attenuation values with respect to slowness values (e.g., across an attenuation map) at block 469. The tracking of peaks in value for slowness and/or attenuation may permit rapid discernment of the presence or absence of various phases, such as casing material, adhesive/cement, and formations. Thus, the method 411 may include identifying material phases by grouping the attenuation values in the attenuation value map at block 473. This type of grouping is most easily seen by viewing various maps that may result from implementing the disclosed methods.

Figure 5:
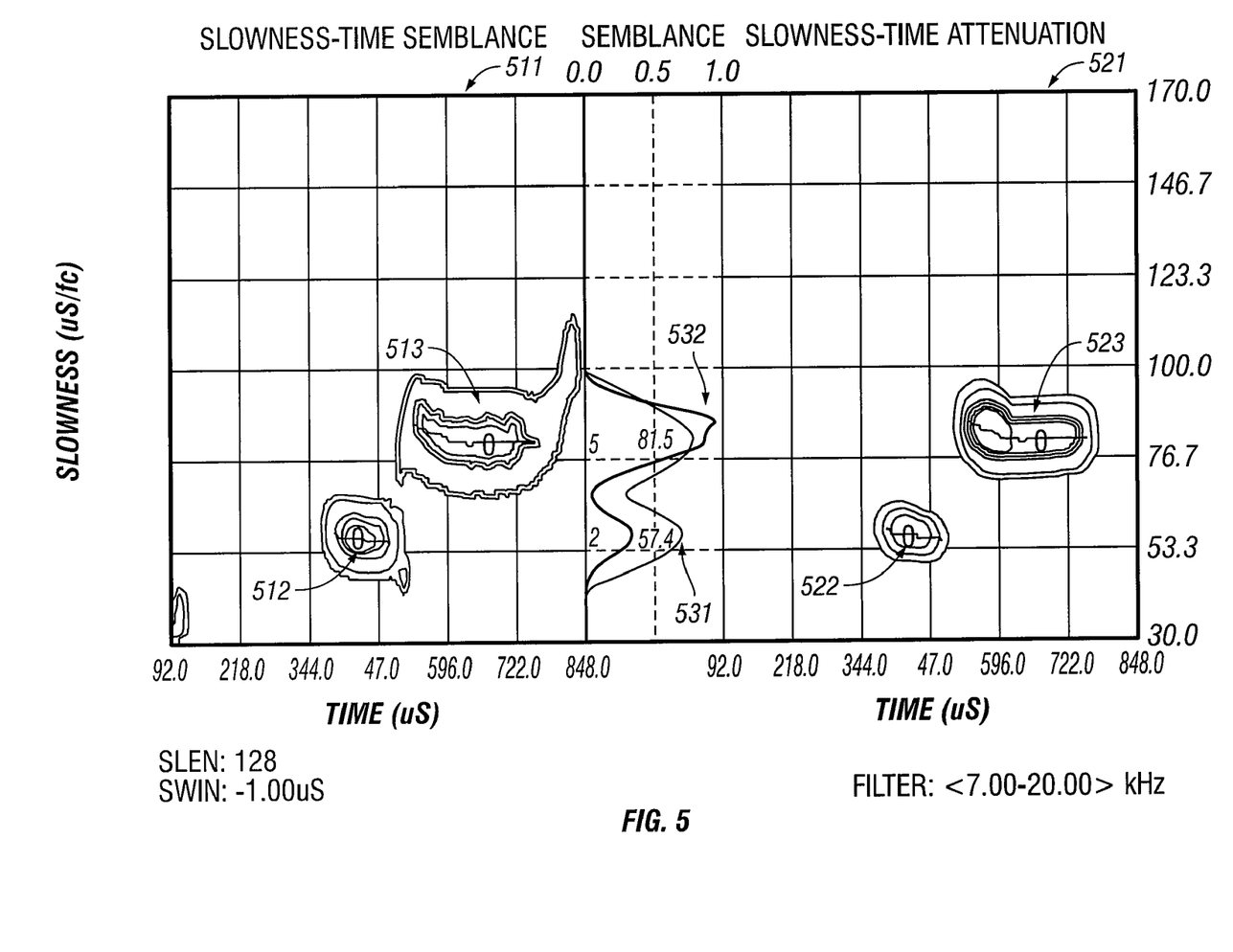
FIG. 5 shows a semblance mapping and a mapping of attenuation as functions of slowness and time according to various embodiments of the invention.

For example, FIG. 5 shows a semblance mapping 511 and a mapping of attenuation 521 as functions of slowness and time according to various embodiments of the invention. Here the images show a simultaneous representation of slowness 512-513 and corresponding attenuation values 522-523 (in this case, $1/\alpha$). Semblance 531 is scaled over a range of zero to one. Attenuation ($1/\alpha$) 532 is scaled according to maximum values. In this case, and example of bonded casing is shown, where the formation arrival can be detected through the casing. It can be noted that the value of attenuation ($1/\alpha$) is low (i.e., relatively high attenuation) for the casing arrival.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 6:
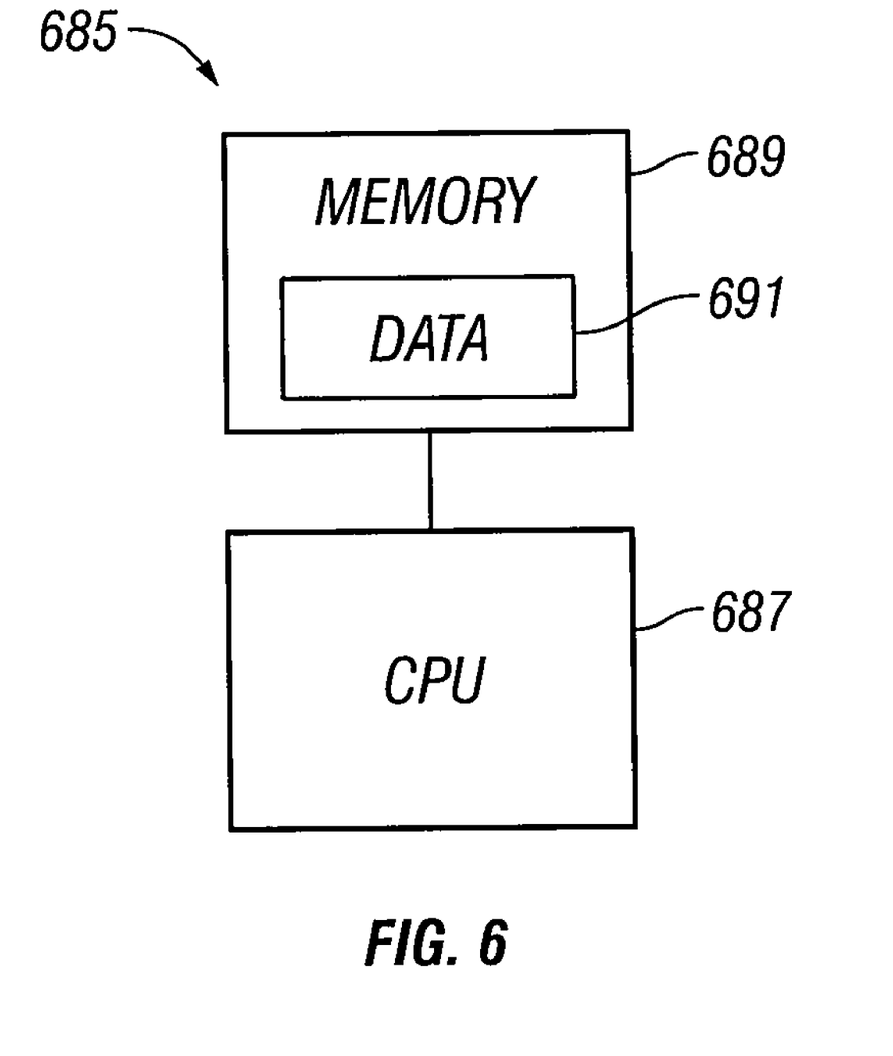
FIG. 6 is a block diagram of an article according to various embodiments of the invention.

FIG. 6 is a block diagram of an article according to various embodiments, such as a computer, a memory system, a magnetic or optical disk, some other storage device, and/or any type of electronic device or system. The article 685 may include a processor 687 coupled to a machine-accessible medium such as a memory 689 (e.g., removable storage media, as well as any memory including an electrical, optical, or electromagnetic conductor) having associated information 691 (e.g., computer program instructions and/or data), which when accessed, results in a machine (e.g., the processor 687) performing such actions as storing attenuation values associated with multiple signals received by multiple receivers from at least one transmitted signal in a memory as a function of reception time and material velocity. In some embodiments, actions may include calculating the attenuation values as a function of a linear fit to a logarithmic ratio, wherein the attenuation values are selected from an inverse length and/or an inverse time.

Other activities may include determining the attenuation values as a function of corresponding semblance map values, as well as displaying the attenuation values as an attenuation value map, and/or displaying the semblance map values as a semblance map. Further activities may include, for example, identifying one or more material phase by grouping the attenuation values in the attenuation value map. Still other embodiments may be realized, as shown in FIG. 7.

Figure 7:
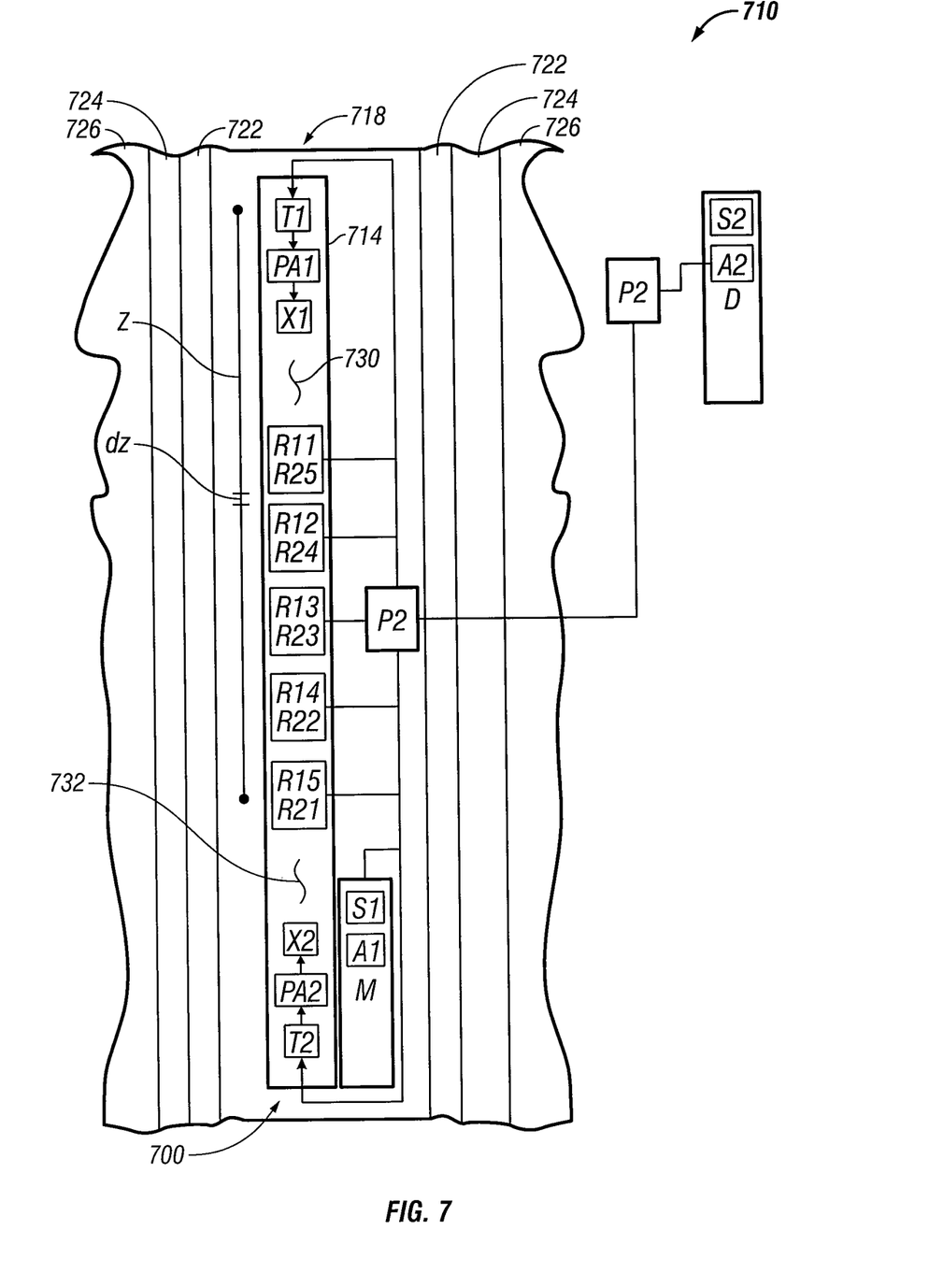
FIG. 7 is an illustration of apparatus and systems according to various embodiments of the invention.

FIG. 7 is an illustration of apparatus 700 and systems 710 according to various embodiments, which may comprise portions of a downhole tool 714 as part of a downhole drilling operation. The downhole tool 714 may be located in a borehole 718, perhaps surrounded by or adjacent to a well casing 722, adhesive 724 (e.g., cement), and one or more formations 726.

Thus, in some embodiments, an apparatus 700 may include a first downhole transducer X1 to transmit a first transmitted signal 730, and a second downhole transducer X2 to transmit a second transmitted signal 732. The apparatus 700 may include a memory M to store attenuation values A1 associated with a first set of multiple signals received by multiple receivers $R_{11}$-$R_{15}$ associated with the first transmitted signal 730, and a second set of multiple signals received by the multiple receivers $R_{21}$-$R_{25}$ associated with the second transmitted signal 732. See the notation for $R_{ij}$ above with respect to the designation of various receivers. The attenuation values A1 may be determined as a function of reception time and material velocity (which may comprise slowness). The attenuation values A1 may be stored in the memory M located in the borehole 718, and/or in a memory located outside of the borehole, perhaps as part of a display D (e.g., attenuation values A2).

In some embodiments, the apparatus 700 may include a first pulse amplifier PA1 coupled to a first transmitter T1 (coupled, in turn, to the first transducer X1). The apparatus 700 may also include a second pulse amplifier PA2 coupled to a second transmitter T2 (coupled, in turn, to the second transducer X2). The apparatus 700 may also include a processor P1, perhaps located in the borehole 718, to initiate transmission of the first and second transmitted signals 730, 732 as a function of a distance dZ along a longitudinal axis Z of a borehole.

In some embodiments, a system 710 may include a downhole tool 714, and/or one or more apparatus similar to or identical to the apparatus 700 described previously. In some embodiments, a system 710 may comprise a display D to store and/or display the attenuation values A1, A2, perhaps as a function of reception time and material velocity. The display D may also be used to store and/or display a semblance map including semblance values S1, S2 associated with the attenuation values A1, A2 as well.

In some embodiments, the system 710 may include a processor P2 to calculate the attenuation values A2 (and/or semblance values S2). The downhole processor P1 may also be used to calculate attenuation values A1 (and/or semblance values S1) in some embodiments.

The apparatus 700, systems 710, downhole tool 714, borehole 718, casing 722, adhesive 724, formations 726, transmitted signals 730, 732, memory M, receivers $R_{11}$-$R_{15}$, $R_{21}$-$R_{25}$, pulse amplifiers PA1, PA2, transmitters T1, T2, transducers X1, X2, processors P1, P2, distance dZ, longitudinal axis Z, attenuation values A1, A2, semblance values S1, S2, and display D may all be characterized as "modules" herein. Such modules may include hardware circuitry, and/or a processor and/or memory circuits, software program modules and objects, and/or firmware, and combinations thereof, as desired by the architect of the apparatus 700 and systems 710, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling operations, and thus, various embodiments are not to be so limited. The illustrations of apparatus 700 and systems 710 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others.

Numerous variations and modifications will become apparent to those skilled in the art once the above disclosure is fully appreciated. For example, the phase semblance may be smoothed using a moving average filter in a fashion similar to one of the outlined embodiments. Also, because the slowness corresponds to the inverse of propagation velocity, each of the methods outlined above may work equivalently with velocity in place of slowness.

Reduced current consumption, which may be desirable for battery-powered operation and in those circumstances where relatively high-temperatures are present, may result from implementing the apparatus, systems, and methods disclosed herein. Some embodiments may operate from a single-voltage supply, providing greater efficiency, a reduced component count, and the ability to amplify signals without a sleep mode or separate physical heat sinking at temperatures of 165 C and above.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, including:
    initiating a first transmitted signal into material comprising a geologic formation;
    generating averaged compensated attenuation values associated with a first set of multiple signals received by multiple receivers along multiple paths between the multiple receivers from the first transmitted signal as a function of reception time and material velocity associated with the material; and
    at least one of storing the averaged compensated attenuation values in a memory or displaying the averaged compensated attenuation values on a display, wherein the averaged compensated attenuation values are determined by peaks in a compensated slowness-time attenuation (STA) map corresponding to peaks in a slowness-time coherency (STC) map, wherein each time, slowness point value in the STA map corresponds to a time, slowness point in the STC map, and wherein the STA map comprises the averaged compensated attenuation values.

2. The method of claim 1, wherein the material velocity comprises slowness.

3. The method of claim 1, wherein the averaged compensated attenuation values vary as a function of at least one of a borehole casing attenuation, an attenuation of an adhesive bonded to a borehole casing, and an attenuation of the geological formation.

4. The method of claim 1, further including:
    calculating the STC map values as a function of the reception time and the material velocity.

5. The method of claim 1, further including:
    compensating the averaged compensated attenuation values using a second set of multiple signals received by the multiple receivers from a second transmitted signal.

6. The method of claim 1, further comprising:
    receiving the first set of multiple signals with the multiple receivers.

7. The method of claim 1, further comprising:
    storing the STC map values calculated as a function of the material velocity in the memory.

8. A method, including:
    displaying averaged compensated attenuation values associated with multiple signals received by multiple receivers along multiple paths between the multiple receivers from at least one transmitted signal as a function of reception time and material velocity on a display, wherein the averaged compensated attenuation values are determined by peaks in a compensated slowness-time attenuation (STA) map corresponding to peaks in a slowness-time coherency (STC) map, wherein each time, slowness point value in the STA map corresponds to a time, slowness point in the STC map, and wherein the STA map comprises the averaged compensated attenuation values.

9. The method of claim 8, further including:
    determining a compensated response value as a function of a response between two of the receivers selected from the multiple receivers.

10. The method of claim 9, further including:
    assigning a plurality of colors to selected groups of the averaged compensated attenuation values.

11. The method of claim 8, wherein the averaged compensated attenuation values are a function of a ratio of responses associated with the multiple receivers.

12. The method of claim 8, further including:
    determining the averaged compensated attenuation values using a one-to-one correspondence with the STC map values.

13. An article including a machine-accessible medium having associated information, wherein the information, when accessed, results in a machine performing:
    initiating at least one transmitted signal into material comprising a geologic formation; and
    storing averaged compensated attenuation values associated with multiple signals received by multiple receivers along multiple paths between the multiple receivers from the at least one transmitted signal in a memory as a function of reception time and material velocity associated with the material, wherein the averaged compensated attenuation values are determined by peaks in a compensated slowness-time attenuation (STA) map corresponding to peaks in a slowness-time coherency (STC) map, wherein each time, slowness point value in the STA map corresponds to a time, slowness point in the STC map, and wherein the STA map comprises the averaged compensated attenuation values.

14. The article of claim 13, wherein the information, when accessed results in the machine performing:
    displaying the averaged compensated attenuation values as at least a portion of the STA.

15. The article of claim 14, wherein the information, when accessed, results in the machine performing:
    identifying at least one material phase by grouping the averaged compensated attenuation values in the STA map.

16. The article of claim 13, wherein units of the averaged compensated attenuation values are selected from one of inverse length and inverse time.

17. An apparatus, including:
    a first downhole transducer to transmit a first transmitted signal;
    a second downhole transducer to transmit a second transmitted signal; and
    a memory to store averaged compensated attenuation values associated with a first set of multiple signals received by multiple receivers along multiple paths between the multiple receivers and associated with the first transmitted signal, and a second set of multiple signals received by the multiple receivers and associated with the second transmitted signal, as a function of reception time and material velocity, wherein the attenuation values are determined by peaks in a compensated slowness-time attenuation (STA) map corresponding to peaks in a slowness-time coherency (STC) map, wherein each time, slowness point value in the STA map corresponds to a time, slowness point in the STC map, and wherein the STA map comprises the averaged compensated attenuation values.

18. The apparatus of claim 17, further including:
a first pulse amplifier coupled to a first transmitter coupled to the first transducer; and
a second pulse amplifier coupled to a second transmitter coupled to the second transducer.

19. The apparatus of claim 17, further including:
a processor to initiate transmission of the first transmitted signal and the second transmitted signal as a function of a distance along a longitudinal axis of a borehole.

20. The apparatus of claim 17, wherein the material velocity comprises slowness.

21. A system, including:
a memory to store averaged compensated attenuation values associated with a first set of multiple signals received by multiple receivers along multiple paths between the multiple receivers and associated with a first transmitted signal, and a second set of multiple signals received by the multiple receivers and associated with a second transmitted signal;
a processor to calculate the averaged compensated attenuation values; and
a display to display the averaged compensated attenuation values as a function of reception time and material velocity, wherein the attenuation values are determined by peaks in a compensated slowness-time attenuation (STA) map corresponding to peaks in a slowness-time coherency (STC) map, wherein each time, slowness point value in the STA map corresponds to a time, slowness point in the STC map, and wherein the STA map comprises the averaged compensated attenuation values.

22. The system of claim 21, wherein the processor is to calculate the averaged compensated attenuation values as part of a two-dimensional matrix forming the STA map.

23. The system of claim 21, wherein the display is to display the STC map.

* * * * *

UNITED STATES PATENT AND TRADEMARK OFFICE
CERTIFICATE OF CORRECTION

PATENT NO. : 7,660,195 B2
APPLICATION NO. : 10/923429
DATED : February 9, 2010
INVENTOR(S) : Batakrishna Mandal et al.

It is certified that error appears in the above-identified patent and that said Letters Patent is hereby corrected as shown below:

On the Title Pg, Item (56), under "Other Publications", line 5, delete "frequnecy" and insert -- frequency --, therefor.

On the Title Pg, Item (56), under "Other Publications", line 7, delete "seismci" and insert -- seismic --, therefor.

In column 12, line 38, in Claim 14, delete "STA." and insert -- STA map. --, therefor.

Signed and Sealed this

Twentieth Day of April, 2010

David J. Kappos
*Director of the United States Patent and Trademark Office*